United States Patent
Chaganti et al.

(10) Patent No.: US 11,075,925 B2
(45) Date of Patent: Jul. 27, 2021

(54) SYSTEM AND METHOD TO ENABLE COMPONENT INVENTORY AND COMPLIANCE IN THE PLATFORM

(71) Applicant: EMC IP Holding Company LLC, Hopkinton, MA (US)

(72) Inventors: Ravikanth Chaganti, Bangalore (IN); Rizwan Ali, Cedar Park, TX (US); Dharmesh Patel, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 292 days.

(21) Appl. No.: 15/884,781

(22) Filed: Jan. 31, 2018

(65) Prior Publication Data
US 2019/0238558 A1   Aug. 1, 2019

(51) Int. Cl.
*H04L 29/06* (2006.01)
*G06F 21/57* (2013.01)
*G06F 21/44* (2013.01)
*G06F 11/22* (2006.01)

(52) U.S. Cl.
CPC ........ *H04L 63/126* (2013.01); *G06F 11/2247* (2013.01); *G06F 21/44* (2013.01); *G06F 21/57* (2013.01); *H04L 63/0853* (2013.01); *H04L 63/10* (2013.01); *G06F 2221/2129* (2013.01)

(58) Field of Classification Search
CPC .......... G06F 21/44; G06F 21/57; G06F 21/73; G06F 2221/2129; G06F 11/2247; G06F 9/4411; G06F 9/4416; G06F 9/44536; H04L 63/0853; H04L 63/10; H04L 63/126
See application file for complete search history.

(56) References Cited

U.S. PATENT DOCUMENTS

| | | |
|---|---|---|
| 5,483,637 A | 1/1996 | Winokur et al. |
| 5,867,714 A | 2/1999 | Todd et al. |
| 6,012,152 A | 1/2000 | Douik et al. |
| 6,317,028 B1 | 11/2001 | Valiulis |
| 6,633,782 B1 | 10/2003 | Schleiss et al. |
| 6,742,141 B1 | 5/2004 | Miller |
| 6,795,935 B1 | 9/2004 | Unkle et al. |
| 7,103,874 B2 | 9/2006 | McCollum et al. |

(Continued)

OTHER PUBLICATIONS

Coulouris et al., Distributed Systems—Concepts and Design, 2012, Addison-Wesley, Fifth Edition, pp. 37-61.*

(Continued)

*Primary Examiner* — Minh Dinh
(74) *Attorney, Agent, or Firm* — Chamberlain, Hrdlicka, White, Williams & Aughtry

(57) ABSTRACT

A computing device includes user resources and a validation agent. The validation agent obtains a new configuration authentication request for the computing device. In response to obtaining the new configuration authentication request, the validation agent identifies the user resources of the computing device; matches an identifier of the computing device to a portion of validated configurations of multiple validated configurations; makes a determination that the identified user resources match at least one validated configuration of the portion of validated configurations of the multiple validated configurations; and authorizes a new configuration for the user resources in response to the determination.

20 Claims, 8 Drawing Sheets

(56) References Cited

U.S. PATENT DOCUMENTS

| | | | |
|---|---|---|---|
| 7,222,127 B1 | 5/2007 | Bem et al. | |
| 7,334,222 B2 | 2/2008 | Keller | |
| 7,490,073 B1 | 2/2009 | Qureshi et al. | |
| 7,500,142 B1 | 3/2009 | Cowart et al. | |
| 7,516,362 B2 | 4/2009 | Connelly et al. | |
| 7,536,595 B1 | 5/2009 | Hiltunen et al. | |
| 7,757,124 B1 | 7/2010 | Singh et al. | |
| 7,827,136 B1 | 11/2010 | Wang | |
| 7,831,693 B2 | 11/2010 | Lai | |
| 7,886,031 B1 | 2/2011 | Taylor et al. | |
| 7,987,353 B2 | 7/2011 | Holdaway et al. | |
| 8,001,527 B1 | 8/2011 | Qureshi et al. | |
| 8,166,552 B2 | 4/2012 | Prafullchandra et al. | |
| 8,290,970 B2 * | 10/2012 | Hohmann, II | G06F 9/4411 707/758 |
| 8,386,930 B2 | 2/2013 | Dillenberger et al. | |
| 8,401,982 B1 | 3/2013 | Satish et al. | |
| 8,583,769 B1 | 11/2013 | Peters et al. | |
| 8,639,798 B2 | 1/2014 | Akiyama et al. | |
| 8,774,054 B2 | 7/2014 | Yin et al. | |
| 8,826,077 B2 | 9/2014 | Bobak et al. | |
| 8,868,987 B2 | 10/2014 | Wagner | |
| 8,874,892 B1 | 10/2014 | Chan et al. | |
| 8,938,621 B2 * | 1/2015 | Mao | G06F 21/70 709/248 |
| 8,995,439 B2 | 3/2015 | Field | |
| 9,122,501 B1 | 9/2015 | Hsu et al. | |
| 9,122,739 B1 | 9/2015 | Yadwadkar et al. | |
| 9,201,751 B1 | 12/2015 | Muthirisavenugopal et al. | |
| 9,225,625 B1 | 12/2015 | He et al. | |
| 9,229,902 B1 | 1/2016 | Leis et al. | |
| 9,278,481 B2 | 3/2016 | Hull | |
| 9,323,789 B1 | 4/2016 | Elliott, IV | |
| 9,355,036 B2 | 5/2016 | Beard et al. | |
| 9,384,082 B1 | 7/2016 | Lee et al. | |
| 9,542,177 B1 | 1/2017 | Johansson et al. | |
| 9,729,615 B2 | 8/2017 | Nair | |
| 9,864,634 B2 | 1/2018 | Kenkre et al. | |
| 9,898,224 B1 | 2/2018 | Marshak et al. | |
| 9,999,030 B2 | 6/2018 | Gu et al. | |
| 10,048,996 B1 | 8/2018 | Bell et al. | |
| 10,057,184 B1 | 8/2018 | Prahlad et al. | |
| 10,097,620 B2 | 10/2018 | Reddy et al. | |
| 10,514,907 B2 | 12/2019 | Chaganti et al. | |
| 2003/0149919 A1 | 8/2003 | Greenwald et al. | |
| 2004/0078683 A1 | 4/2004 | Buia et al. | |
| 2004/0088145 A1 | 5/2004 | Rosenthal | |
| 2004/0177168 A1 | 9/2004 | Alabraba et al. | |
| 2004/0177354 A1 * | 9/2004 | Gunyakti | G06F 21/121 717/174 |
| 2004/0225381 A1 | 11/2004 | Ritz et al. | |
| 2004/0250260 A1 | 12/2004 | Pioso | |
| 2005/0033770 A1 | 2/2005 | Oglesby et al. | |
| 2005/0078656 A1 | 4/2005 | Bryant et al. | |
| 2005/0120112 A1 | 6/2005 | Wing et al. | |
| 2005/0144151 A1 | 6/2005 | Fischman et al. | |
| 2005/0144188 A1 | 6/2005 | Bailey et al. | |
| 2006/0149408 A1 | 7/2006 | Speeter et al. | |
| 2006/0178864 A1 | 8/2006 | Khanijo | |
| 2006/0179116 A1 | 8/2006 | Speeter et al. | |
| 2006/0235962 A1 | 10/2006 | Vinberg et al. | |
| 2007/0143851 A1 | 6/2007 | Nicodemus et al. | |
| 2007/0202469 A1 | 8/2007 | Davidson | |
| 2008/0037532 A1 | 2/2008 | Sykes et al. | |
| 2008/0065700 A1 | 3/2008 | Lim | |
| 2008/0201470 A1 | 8/2008 | Sayama | |
| 2008/0228755 A1 | 9/2008 | Haga et al. | |
| 2008/0262860 A1 | 10/2008 | Schneider et al. | |
| 2009/0012805 A1 | 1/2009 | Schnell et al. | |
| 2009/0113248 A1 | 4/2009 | Bock et al. | |
| 2009/0165099 A1 | 6/2009 | Eldar et al. | |
| 2009/0183010 A1 | 7/2009 | Schnell et al. | |
| 2009/0260071 A1 | 10/2009 | Sadovsky et al. | |
| 2009/0282283 A1 | 11/2009 | Sakakura et al. | |
| 2009/0307333 A1 | 12/2009 | Welingkar | |
| 2010/0024001 A1 | 1/2010 | Campbell | |
| 2010/0057677 A1 | 3/2010 | Rapp et al. | |
| 2010/0180221 A1 | 7/2010 | Cloward et al. | |
| 2010/0229022 A1 | 9/2010 | Anand et al. | |
| 2010/0312522 A1 | 12/2010 | Laberge et al. | |
| 2010/0318487 A1 | 12/2010 | Marvasti | |
| 2010/0325493 A1 | 12/2010 | Morimura et al. | |
| 2011/0078428 A1 | 3/2011 | Hamid | |
| 2011/0093703 A1 | 4/2011 | Etchegoyen | |
| 2011/0270482 A1 | 11/2011 | Holzer | |
| 2011/0289342 A1 | 11/2011 | Schaefer et al. | |
| 2011/0289343 A1 | 11/2011 | Schaefer et al. | |
| 2011/0302305 A1 | 12/2011 | Morimura et al. | |
| 2012/0041976 A1 | 2/2012 | Annapragada | |
| 2012/0110142 A1 | 5/2012 | Montagna et al. | |
| 2012/0144244 A1 | 6/2012 | Dan et al. | |
| 2012/0150926 A1 | 6/2012 | Adkins et al. | |
| 2012/0166142 A1 | 6/2012 | Maeda et al. | |
| 2012/0182151 A1 | 7/2012 | Tong | |
| 2012/0233216 A1 | 9/2012 | Lim | |
| 2012/0265872 A1 | 10/2012 | Chilton | |
| 2012/0271927 A1 | 10/2012 | Shakirzyanov et al. | |
| 2012/0331526 A1 | 12/2012 | Caudle et al. | |
| 2013/0151975 A1 | 6/2013 | Shadi et al. | |
| 2013/0185667 A1 | 7/2013 | Harper et al. | |
| 2013/0317870 A1 | 11/2013 | Franco et al. | |
| 2013/0326029 A1 | 12/2013 | Flynn | |
| 2014/0069291 A1 | 3/2014 | Yang | |
| 2014/0082417 A1 | 3/2014 | Barton et al. | |
| 2014/0115176 A1 | 4/2014 | Kamboh et al. | |
| 2014/0281675 A1 | 9/2014 | Sreenivasan et al. | |
| 2014/0304399 A1 | 10/2014 | Chaudhary et al. | |
| 2014/0304402 A1 | 10/2014 | Prakash et al. | |
| 2014/0324276 A1 | 10/2014 | Weaks | |
| 2015/0117174 A1 | 4/2015 | Alber et al. | |
| 2015/0120359 A1 | 4/2015 | Dongieux | |
| 2015/0149822 A1 | 5/2015 | Coronado et al. | |
| 2015/0256394 A1 | 9/2015 | Palmer | |
| 2015/0324255 A1 | 11/2015 | Kochunni | |
| 2016/0042288 A1 | 2/2016 | Cohen et al. | |
| 2016/0048611 A1 | 2/2016 | Cox | |
| 2016/0057009 A1 | 2/2016 | Kadayam et al. | |
| 2016/0110240 A1 | 4/2016 | Reger et al. | |
| 2016/0112504 A1 | 4/2016 | Mathur et al. | |
| 2016/0173690 A1 | 6/2016 | Perez et al. | |
| 2016/0294643 A1 | 10/2016 | Kim | |
| 2016/0302323 A1 | 10/2016 | Gosselin | |
| 2017/0017881 A1 | 1/2017 | Langley et al. | |
| 2017/0032091 A1 | 2/2017 | Rudorfer et al. | |
| 2017/0094003 A1 | 3/2017 | Gahlot et al. | |
| 2017/0206128 A1 | 7/2017 | Anderson et al. | |
| 2017/0339005 A1 | 11/2017 | Yuan et al. | |
| 2018/0025166 A1 | 1/2018 | Daniel et al. | |
| 2018/0034709 A1 | 2/2018 | Chen et al. | |
| 2018/0041388 A1 | 2/2018 | Moens et al. | |
| 2018/0285009 A1 | 10/2018 | Guim Bernat et al. | |
| 2018/0302277 A1 | 10/2018 | Shimamura et al. | |
| 2018/0321934 A1 * | 11/2018 | Chaganti | G06F 8/71 |
| 2018/0322019 A1 | 11/2018 | Stowell et al. | |
| 2018/0329579 A1 | 11/2018 | Kaimal et al. | |
| 2019/0123985 A1 | 4/2019 | Rao et al. | |
| 2019/0149408 A1 | 5/2019 | Li | |
| 2019/0182105 A1 | 6/2019 | Stephens et al. | |
| 2019/0303137 A1 | 10/2019 | Chaganti et al. | |
| 2019/0306013 A1 | 10/2019 | Ali et al. | |
| 2019/0324841 A1 | 10/2019 | Patel et al. | |

OTHER PUBLICATIONS

Extended European Search Report issued in corresponding European Application No. 18200661.9 dated Apr. 1, 2019. (9 pages).

"Integrated Dell Remote Access Controller 8 (iDRAC8)", Version 2.05.05.05 User's Guide, Dell Inc., Dec. 2014 (348 pages).

Iler, Doug, et al., "Introducing iDRAC8 with Lifecycle Controller for Dell 13th Generation PowerEdge Servers", A Dell Deployment and Configuration Guide, Dell Inc., Sep. 2014 (16 pages).

Zhengyu Liang et al.; "ClusterProbe: An Open, Flexible and Scalable Cluster Monitoring Tool"; IEEE Computer Society Interna-

(56) References Cited

OTHER PUBLICATIONS tional Workshop on Cluster Computing; pp. 261-268; 1999.
"Dell DRAC—Wikipedia"; XP055602141; Mar. 23, 2018; https://en.wikipedia.org/w/index.php?title=Dell_DRAC&oldid=831957421.
'Dell EMC OpenManage Essentials Version 2.3: Users Guide'; XP055602720; Oct. 1, 2017; https://topics-cdn.dell.com/pdf/openmanage-essentials-v23 users-guide en-us.pdf.
Extended European Search Report issued in corresponding European Application No. 19151952.9, dated Jul. 1, 2019.
Duncan Tweed; "BMC Atrium Discovery User Guide"; BMC Software, Inc.; Mar. 2014; retrieved from https://bmc.com/.
Duncan Tweed; "Baseline configuration"; BMC Software, Inc.; Apr. 7, 2015; retrieved from https://bmc.com/.
Masoom Parvez; "AutomaticGroup Node"; BMC Software, Inc.; 2014; retrieved from https://bmc.com/.
George Coulouris et al, Distributed Systems Concepts and Design.

\* cited by examiner

SYSTEM AND METHOD TO ENABLE
COMPONENT INVENTORY AND
COMPLIANCE IN THE PLATFORM

BACKGROUND

Computing devices may include any number of internal components such as processors, memory, and persistent storage. Each of the internal components may operate with other components of the computing devices. For example, some processors store generated data in a persistent storage and may utilize capacity of the memory to perform computations.

In a network environment, multiple computing devices may cooperate to accomplish a task. For example, multiple computing devices may perform different computations that may be used, in turn, to generate a final result.

SUMMARY

In one aspect, a computing device in accordance with one or more embodiments of the invention includes user resources and a validation agent. The validation agent obtains a new configuration authentication request for the computing device. In response to obtaining the new configuration authentication request, the validation agent identifies the user resources of the computing device; matches an identifier of the computing device to a portion of validated configurations of multiple validated configurations; makes a determination that the identified user resources match at least one validated configuration of the portion of validated configurations of the multiple validated configurations; and authorizes a new configuration for the user resources in response to the determination.

In one aspect, a method for authorizing a new configuration of user resources of a computing device in accordance with one or more embodiments of the invention includes obtaining, by a validation agent hosted by the computing device, a new configuration authentication request for the computing device. The method includes, in response to the obtained new configuration authentication request, identifying, by the validation agent, the user resources of the computing device; matching, by the validation agent, an identifier of the computing device to a portion of validated configurations of multiple validated configurations stored in a persistent storage of the validation agent; making a determination, by the validation agent, that the identified user resources match at least one validated configuration of the portion of validated configurations of the multiple validated configurations based on the matching; and authorizing, by the validation agent, the new configuration for the user resources in response to the determination.

In one aspect, a non-transitory computer readable medium in accordance with one or more embodiments of the invention includes computer readable program code, which when executed by a computer processor enables the computer processor to perform a method for authorizing a new configuration of user resources of a computing device. The method includes, in response to the obtained new configuration authentication request, identifying, by the validation agent, the user resources of the computing device; matching, by the validation agent, an identifier of the computing device to a portion of validated configurations of multiple validated configurations stored in a persistent storage of the validation agent; making a determination, by the validation agent, that the identified user resources match at least one validated configuration of the portion of validated configurations of the multiple validated configurations based on the matching; and authorizing, by the validation agent, the new configuration for the user resources in response to the determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
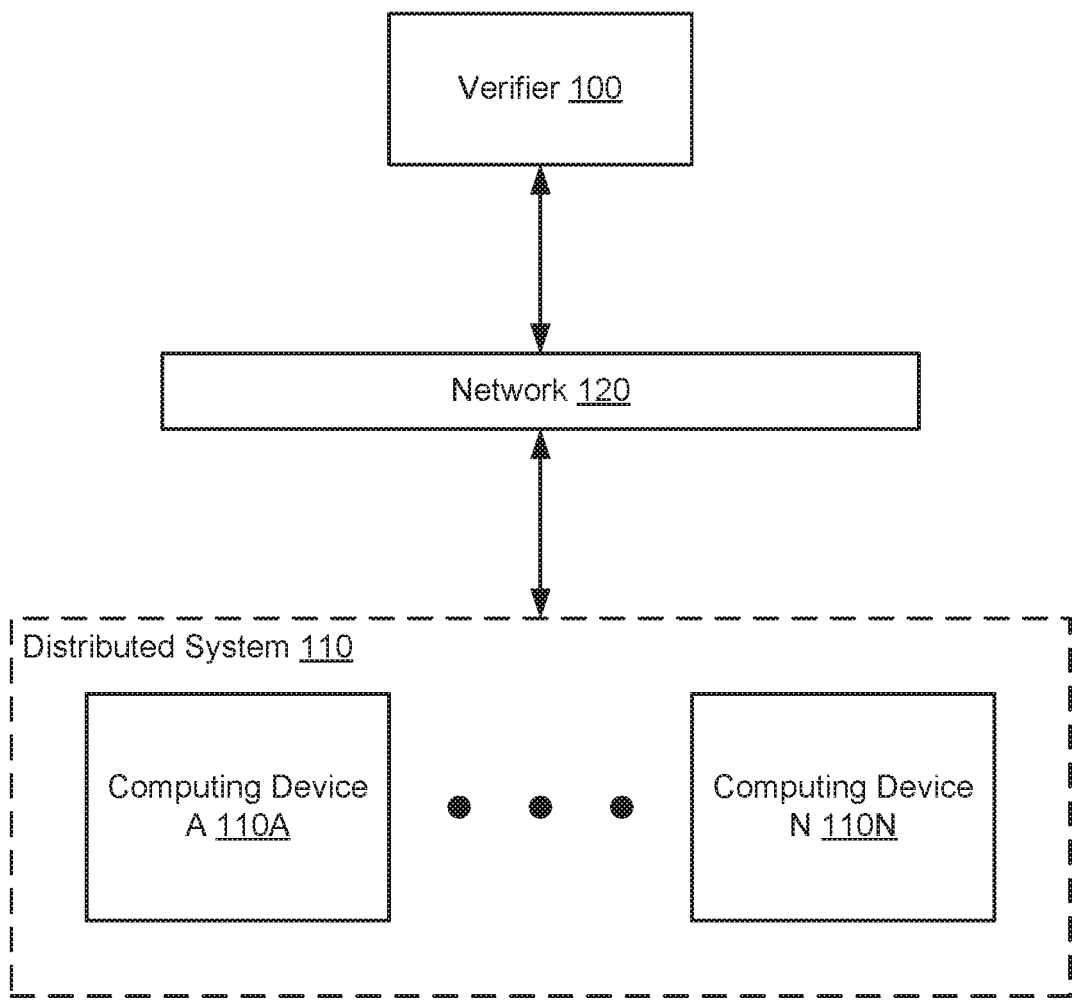
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for performing computations, storing data, and/or performing computations in a network environment. More specifically, a distributed system may include any number of computing devices that are orchestrated to accomplish a goal. Each of the computing devices may be configured to perform different tasks to achieve the goal. For example, the goal of the distributed system may be to store data. Different computing devices of the distributed system may be configured to perform different functions such as, for example, segmentation of data, deduplication of the segmented data, and/or storage of the deduplicated data, in addition to other functions.

Overtime, it may be desirable to add or remove components from computing devices. For example, newer processors may replace old processors in computing devices to improve the performance of the distributed system. In one more embodiments of the invention, it is first verified that a computing device of the distributed system has a validated configuration before authorizing a new configuration of the computing device. As used herein, a validated configuration refers to a combination of hardware components, firmware, firmware settings, and/or software drivers that has been previously verified as properly functioning. Due to the complex interaction of hardware components, firmware, firmware settings, and/or software drivers, various combinations of hardware components, firmware, firmware settings, and/or software drivers may not function correctly. As used herein, a new configuration of a computing device refers to the addition or removal of hardware, firmware, and/or software components such as drivers of the computing device. A new configuration may also include changes to firmware settings, or other software component settings.

In one or more embodiments of the invention, computing devices of a distributed system may each host a validation agent. The validation agent may determine whether user resources of the computing device are of a validated configuration. As used herein, user resources refer to hardware components, firmware, firmware settings, and/or software components of the computing device that may be configured to accomplish a goal of the distributed system.

In one or more embodiments of the invention, the validation agent is not configurable by the computing device. While hosted by the computing device, the validation agent may not be directly interacted with by the user resources. For example, upon boot a basic input/output system (or another initialization agent) of a computing device may recognize, during hardware initialization, that the validation agent does not provide services to an operating system or other user application.

As used herein, a user application refers to any process executing on a computing device initiated by a user. In a distributed environment, the user may be, for example, an orchestration manager. In contrast, processes executing using computing resources of the verification manager may not be initiated by a user.

As used herein, computing resources refer to processor computing cycles, communication bandwidth, memory bandwidth, persistent storage input-output cycles, and/or memory storage capacity or persistent storage capacity. Memory may be provided by, for example, random access memory. Persistent storage may be provided by, for example, a solid state hard disk drive. Processor computing cycles may be provided by, for example, a central processing unit. Communication bandwidth may be provided by, for example, a network interface card.

In one or more embodiments of the invention, the validation agent is implemented as a hardware component. The hardware component may be operably connected with an interconnect of a computing device. The interconnect may be operably connect the various hardware components of the user resources of the computing device. For example, the interconnect may be a memory controller, bus controller, chipset of a mother board, or other communication controller. Thus, a computing device in accordance with one or more embodiments of the invention may include user resources that include processors, memory, persistent storage, and/or a validation agent. The validation agent may also include additional processors, memory, and/or persistent storage.

FIG. 1A shows a system in accordance with one or more embodiments of the invention. The system may include a distributed system (110) and a verifier (100) that initiates functions of validation agents of computing devices (110A, 110N) of the distributed system (110). The verifier (100) and distributed system (110) may be operably connected by a network (120). Each component of the system is discussed below.

In one or more embodiments of the invention, the verifier (100) initiates functions of the validation agents of the computing devices (110A, 110N) of the distributed system (110). The verifier (100) may initiate the functions of the validation agents when an upgrade of a computing device is being performed. The upgrade may be a removal or replacement of an existing component of a computing device or an addition of a new component to the computing device. The functions of the validation agents initiated by the verifier (100) may be used to determine whether the current configuration of a computing device is a validated configuration.

For example, over time the components of a computing device may change due to breakage, upgrading, or other causes. When initially deployed, the computing devices (110A) may each have a configuration that is a validated configuration. The changes to the computing devices over time may cause the computing devices to no longer have a current configuration that is a validated configuration.

The verifier (100) may be any entity operably connected to the validation agent of a computing device. While the verifier (100) in FIG. 1 is illustrated as being separate from the distributed system (110), the verifier (100) maybe a component of the distributed system (110), may be the computing device hosting the validation agent, or another component of the system of FIG. 1 without departing from the agent.

In one or more embodiments of the invention, the verifier is implemented as a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the verifier (100) described in this application and/or perform the method illustrated in FIG. 6. For additional details regarding a computing device, See FIG. 7.

In one or more embodiments of the invention, the distributed system (110) orchestrates the operation of computing devices (110A, 110N) to accomplish goals. The goals may be, for example, to store data, to provide stored data, or to perform computations on stored data. The distributed system (110) may be, for example, a computer cluster. While the distributed system (110) is illustrated as only include computing devices (110A, 110N), the distributed system (110) may include other components such as switches, routers, network attached storage, or other devices without departing from the invention. The other components (not shown) may provide operable connections between computing devices of the distributed system (110).

In one or more embodiments of the invention, the distributed system (110) orchestrates the operation of the computing devices (110A, 110N) by configuring each of the computing devices (110A, 110N). The computing devices (110A, 110N) may be configured by loading computing instructions on persistent storage of the respective computing devices (110A, 110N) that are executed by processors of the respective computing devices. Each of the computing devices (110A, 110N) may be configured to perform similar or different functions without departing from the invention.

For example, to orchestrate the storage of deduplicated data the distributed system (110) may configure each of: (i) a first portion of the computing devices to segment data, (ii) a second portion of the computing devices to compute fingerprints of the segments of the data, (iii) a third portion of the computing devices to determine whether the fingerprints of the segments of the data match fingerprints of already stored segments, and (iv) a fourth portion of the segments to store the segments of the data having associated fingerprints that do not match finger prints of already stored segments of data. Thus, computing devices (110A, 110N) may be configured to perform different tasks to accomplish a goal. The computing devices (110A, 11N) may be divided into any number of groupings and may perform any number of different or similar functions without departing from the invention. For additional details regarding the computing devices (110A, 110N), See FIG. 2.

In one or more embodiments of the invention, the network (112) operably connects the verifier (100) to the distributed system. The network (112) may be any type of communication link that includes any combination of wires and/or wireless connections. The network (120) may be, for example, a local area network connected to the Internet which, in turn, is operably connected to the distributed system. Other communication topologies may be used to facilitate communication between the verifier (100) and the distributed system (110) without departing from the invention.

While the system of FIG. 1 has been illustrated as including a limited number of components for the sake of brevity, the system may include additional components (not shown), fewer components (not shown), and/or different components (not shown), without departing from the invention.

Figure 2:
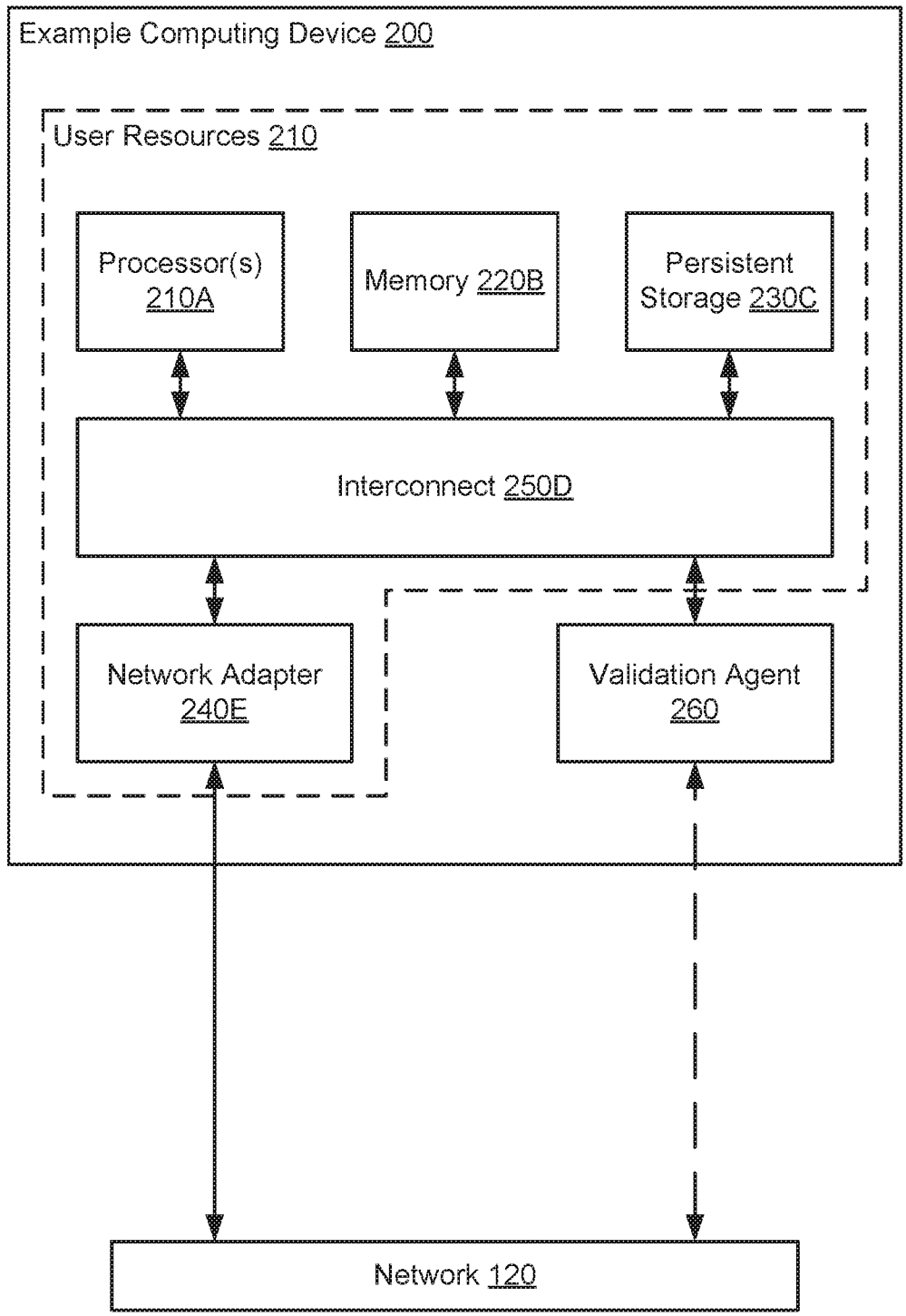
FIG. 2 shows a diagram of a computing device hosting a validation agent in accordance with one or more embodiments of the invention.

FIG. 2 shows a diagram of an example computing device (200) in accordance with one or more embodiments of the invention. The computing devices (110A, 110N, FIG. 1) of the distributed system (110, FIG. 1) may be similar to the example computing device (200).

In one or more embodiments of the invention, the example computing device (200) performs operations directed by a distributed system. For example, the example computing device (200) may run software deployed to the example computing device (200) by the distributed system. By running the software deployed by the distributed system, the example computing device (200) may perform computations or store data as directed by the distributed system.

Additionally, in one or more embodiments of the invention, the example computing device (200) provides a mechanism for verifying a configuration of the example computing device (200). The configuration may include the type and/or version of hardware components of the example computing device (200) and/or drivers, or other software elements used to operate hardware components, executing and/or stored on the example computing device (200).

In one or more embodiments of the invention, the example computing device (200) may provide mechanisms for executing customized processes and/or storing data by a remote user without impacting a local user's use of the example computing device (200). As used herein, a local user refers to an owner or operator of the example computing device (200). As used herein, a remote user refers to a third party.

To provide the above noted functionality, in one or more embodiments of the invention, the example computing device (200) includes user resources (210) and a validation agent (260). The user resources (210) may be controlled by a local user and the validation agent may be controlled by a remote user.

In one or more embodiments of the invention, the user resources (210) include processor(s) (210A), memory (220B), persistent storage (230C), a network adapter (240E), and an interconnect (250D).

The processor(s) (210A) may be, for example, central processing units, microcontrollers, or embedded computing devices such as digital signal processors, field programmable gate arrays, or application specific integrated circuits. The processors(s) (210A) maybe other types of digital processing devices without departing from the invention. Additionally, the processor(s) (210A) may execute program code stored in the persistent storage (230C) or other storages to run user applications.

The memory (220B) may be volatile memory such as, for example, dynamic random access memory or static random access memory. The memory (220B) may be non-volatile memory such as, for example, flash memory. The memory (210B) maybe other types of digital memory without departing from the invention.

The persistent storage (230C) store data and may be, for example, hard disk drives, solid state drives, tape drives, or any combination thereof. The persistent storage (230C) maybe other types of digital storage without departing from the invention. Additionally, the persistent storage (230C) may store program code for user applications.

The network adapter (240E) may connect the example computing device (200) to the network (120) or other computing devices and may be, for example, a network interface controller. The network adapter (240E) may be other types of devices for providing a network interface without departing from the invention.

The interconnect (250D) may provide operable connections between the other components of the user resources and may be, for example, memory controllers, communication busses, and/or chipsets for providing inter-component communications. The chipsets may include a BIOS or other software for initializing and/or providing hardware access services to user application. The interconnect (250D) may be other types of hardware devices for providing communications between components without departing from the invention. Additionally, the interconnect (250D) may also be operably connected to the validation agent.

For the sake of brevity, the user resources (210) have been illustrated as including a limited number of hardware components. However, the user resources (210) may include any type and/or quantity of hardware components without departing from the invention.

In addition to the aforementioned hardware components, the user resources (210) may also include drivers or other software for controlling hardware components of the user resources (210).

In one or more embodiments of the invention, the validation agent (260) performs user resources (210) verifications. The verification may include: (i) obtaining a current configuration of the user resources (210), (ii) determining whether the current configuration matches a validated configuration, and (iii) authorizing or rejecting a change the configuration of the user resources (210) based on the determination. In addition, the validation agent (260) may include separate computing resources for executing application invoked by remote users.

In one or more embodiments of the invention, the validation agent (260) is controlled by a remote user via an operable connection. The validation agent (260) may advertise an internet protocol address, or other identifier, on a network that is separate from the internet protocol address of the example computing device (200). Thus, the validation agent (260) may distinguish itself from the example computing device (200) in the network environment and thereby enable other entities to address network (120) traffic to the validation agent (260).

In one or more embodiments of the invention, the validation agent includes a network adapter than is separate from the network adapter (240E) of the user resources (210), as illustrated by the dashed arrow between the validation agent and the network (120) in FIG. 2. By including a separate network adapter, the validation agent (260) may communicate via the network (120) without utilizing the network adapter (240E) of the user resources (210). In one or more embodiments of the invention, the validation agent may utilize the network adapter (240E) of the user resources (210) via the interconnect (250D). Thus, in some embodiments of the invention, the validation agent (260) does not include a separate network adapter. For additional details regarding the validation agent (260), See FIG. 3.

While the example computing device (200) of FIG. 2 has been illustrated as including a limited number of components for the sake of brevity, the example computing device (200) may include additional components (not shown), fewer components (not shown), and/or different components (not shown), without departing from the invention. For example, the example computing device (200) may include user interface components, video processors, power supplies, or any other type of component operably connectable to the example computing device (200). Additionally, while illustrated as a single device, the example computing device (200) may be implemented as a logical device that utilizes the computing resources of one or more physical devices without departing from the invention.

Figure 3:
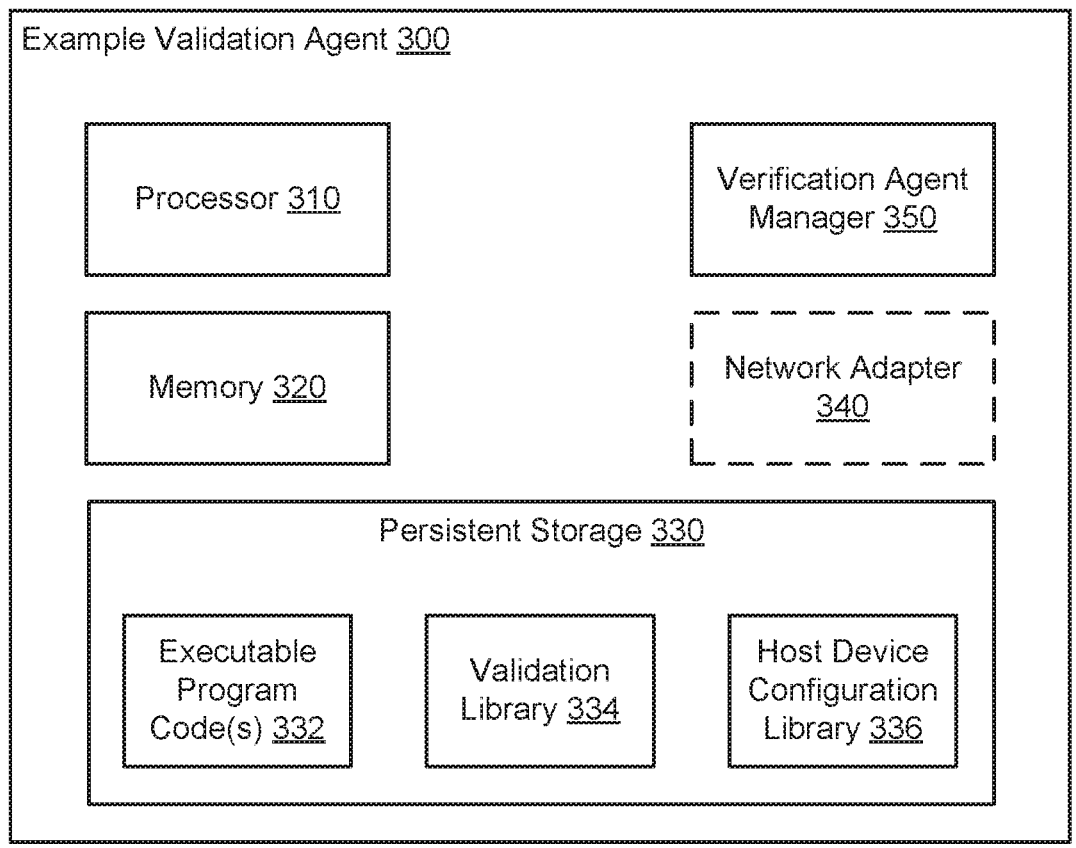
FIG. 3 shows a diagram of a validation agent in accordance with one or more embodiments of the invention.

FIG. 3 shows a diagram of an example validation agent (300) in accordance with one or more embodiments of the invention. The validation agent (260, FIG. 2) of the example computing device (200, FIG. 2) may be similar to the example validation agent (300).

In one or more embodiments of the invention, the example validation agent (300) is a hardware device hosted by a computing device. As used herein, hosted by means to be a separate physical distinguishable part of a device. The device may supply power to the part.

In one or more embodiments of the invention, the example validation agent (300) includes computing resources for performing operations. The computing resources may enable the example validation agent (300) to perform computations, store data, or perform other functions without utilizing the device hosting the example validation agent (300). Additionally, the computing resources of the example validation agent (300) may enable the example validation agent (300) to operate independently of a host computing device.

In one or more embodiments of the invention, the example validation agent (300) may be controlled by a remote user. The remote user may cause the example validation agent (300) to perform operations without invocation by a local user of the computing device hosting the example validation agent (300).

In one or more embodiments of the invention, the example validation agent (300) operably connects to a host computing device via an interconnect of the host or other internal communication system of the host computing system. The example validation agent (300) may issue commands to components of user resources of the host computing system without the commands being invoked by a local user. Thus, the example validation agent (300) may cause the user resources of the host computing system to perform operations, send data, or perform other functions without notifying the local user.

In one or more embodiments of the invention, the example validation agent (300) may receive program code and/or instructions for execution of the program code from a remote user. In one or more embodiments of the invention, the example validation agent (300) may receive data from a remote user. The data may include minimum requirements, or other standards, for a configuration of the user resources. The data may be other types of data and/or reflect other aspects of the user resources of the host computing device without departing from the invention.

To provide the aforementioned functionality, in one or more embodiments of the invention, the example validation agent (300) includes one or more of a processor (310), memory (320), persistent storage (330), a network adapter (340), and a validation agent manager (350). The example validation agent (300) may include additional components without departing from the invention. Each component of the example validation agent (300) is discussed below.

The processor (310) may be, for example, a central processing unit, a microcontroller, or embedded computing devices such as a digital signal processor, a field programmable gate array, or an application specific integrated circuit. The processors (310) maybe other types of digital processing devices without departing from the invention. Additionally, the processor (310) may execute program codes (332) stored in the persistent storage (330) or other storages to remote user applications.

The memory (320) may be volatile memory such as, for example, dynamic random access memory or static random access memory. The memory (320) may be non-volatile memory such as, for example, flash memory. The memory (320) maybe other types of digital memory without departing from the invention.

The persistent storage (330) store data and may be, for example, hard disk drives, solid state drives, tape drives, or any combination thereof. The persistent storage (330) maybe other types of digital storage without departing from the invention. Additionally, the persistent storage (330) may store executable program codes (332) for user applications, a validation library (334), and a host device configuration library (336). The validation library (334) and host device configuration library (336) may be used when validating a configuration of user resources of a host device. For additional details regarding the validation library (334) and host device configuration library (336), See FIGS. 4A and 4B, respectively.

The network adapter (340) may connect the example validation agent (300) to a network or other computing devices and may be, for example, a network interface controller. The network adapter (340E) may be other types of devices for providing a network interface without departing from the invention. In FIG. 3, the network adapter (340) is illustrated in dashing to indicate that it is not present in some embodiments of the invention. As discussed with respect to FIG. 2, in some embodiments of the invention, a validation agent (e.g., 300) may utilize a network adapter of a host computing device to communicate with other devices via a network.

The validation agent manager (350) may initialize and/or orchestrate the example validation agent (300) and may be, for example, memory controllers, communication busses, and/or chipsets for providing inter-component communications and/or orchestration. The chipsets may include a BIOS or other software for initializing and/or providing hardware access services to application. The validation agent manager (350) may be other types of hardware devices for providing communications between components and/or orchestration without departing from the invention. Additionally, the validation agent manager (350) may also be operably connected to the validation agent.

In one or more embodiments of the invention, the executable program codes (332) may provide functionality to: (i) obtain a configuration of user resources of a host computing device, (ii) generate a compliance report that indicates differences between the obtained configuration and a validated configuration, and/or (iii) update validated comparison based on data received from a remote user. The executable program code(s) may provide additional functionality without departing from the invention. In one or more embodiments of the invention, executing the executable program codes (332) via a processor (310) may cause the example validation agent (300) to perform all or a portion of the methods illustrated in FIG. 5.

While the example validation agent (300) has been described as a physical device, the example validation agent (300) may be implemented as computing instructions performed by a processor of a computing device without departing from the invention. For example, a host computing device may be executing a hypervisor running two virtual machines. A first virtual machine may execute user applications and the second virtual machine may perform the functions of the example validation agent (300).

While the example validation agent (300) of FIG. 3 has been illustrated as including a limited number of components for the sake of brevity, the example validation agent (300) may include additional components (not shown), fewer components (not shown), and/or different components (not shown), without departing from the invention. Additionally, while illustrated as a single device, the example validation agent (300) may be implemented as a logical device that utilizes the computing resources of one or more physical devices without departing from the invention.

As discussed above, the example validation agent (300) may utilize or generate data structures including a validation library (334) and a host device configuration library (336) stored in the persistent storage (330). To further clarify the aforementioned data structures, FIGS. 4A and 4B show examples of the aforementioned data structures.

Figure 4A:
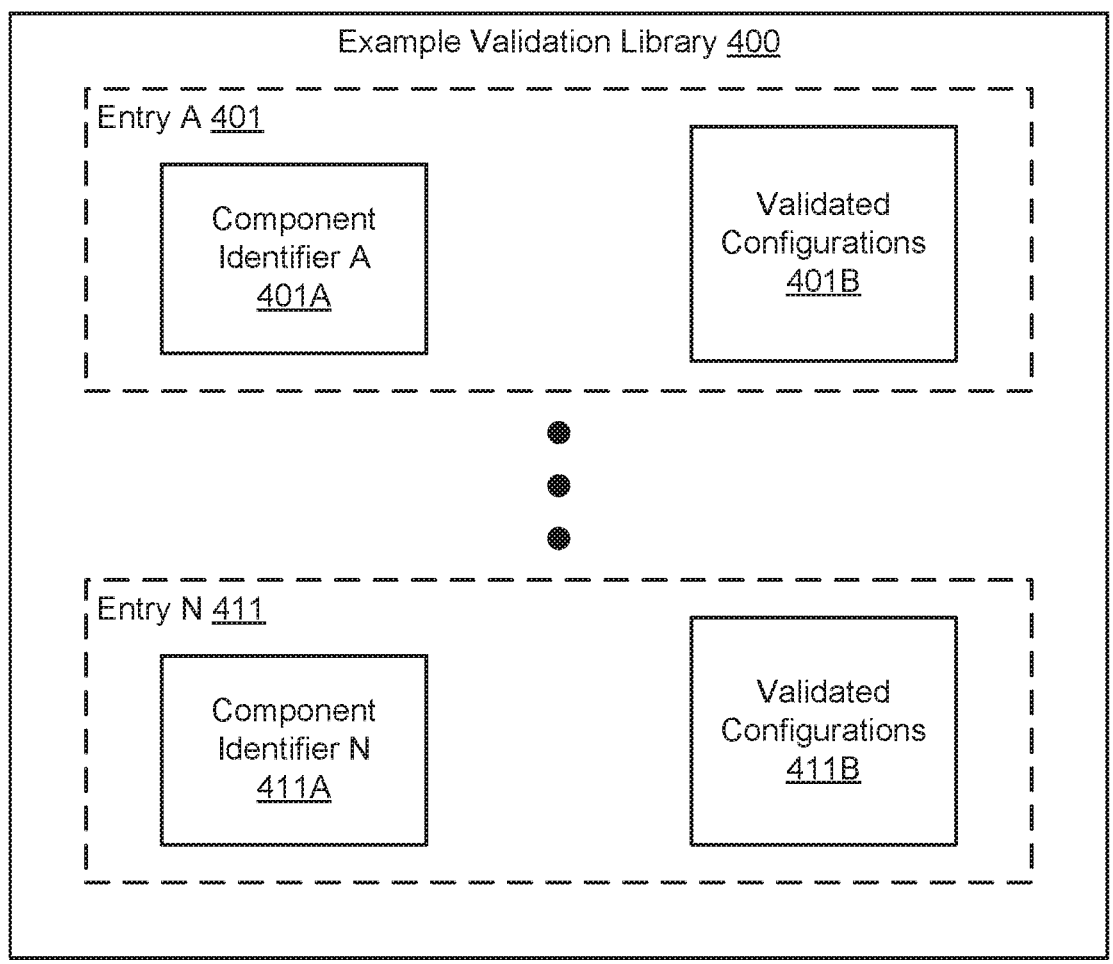
FIG. 4A shows a diagram of an example validation library in accordance with one or more embodiments of the invention.
Figure 4B:
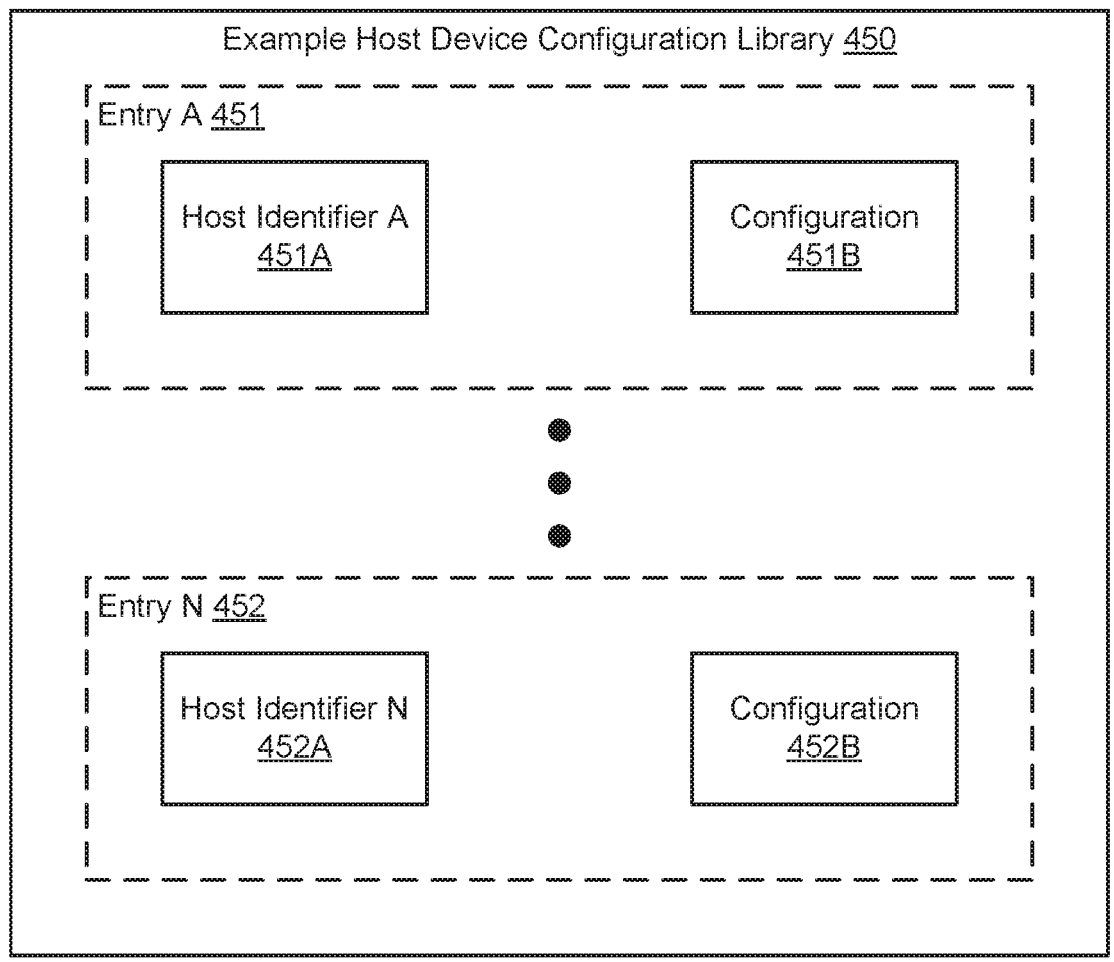
FIG. 4B shows a diagram of an example host device configuration library in accordance with one or more embodiments of the invention.

FIG. 4A shows a diagram of an example validation library (400) in accordance with one or more embodiments of the invention. The example validation library (400) may be a data structure that includes information regarding validated configurations for user resources. The example validation library (400) maybe stored on a persistent storage of a validation agent. The example validation library (400) may be generated by a verifier or other entity.

In one or more embodiments of the invention, each of the validated configurations may be associated with a type of component of a computing device. For example, a validated configuration may be associated with all computing devices components that are of a particular model number.

In one or more embodiments of the invention, the validated configurations (401B, 411B) may be a range of version numbers of a component. For example, a validated configuration may specify version numbers 1-4 of a solid state disk type of which there is 5 versions. In one or more embodiments of the invention, the validated configurations (401B, 411B) may be a list of versions of device drivers or other firmware associated with a component. For example, a validated configuration may specify version numbers 2-3 of a firmware for a solid state disk model of which there are 4 versions. The validated configurations (401B, 411B) may include other ranges of characteristics of components and/or firmware associated with the components without departing from the invention.

In one or more embodiments of the invention, the example validation library (400) includes entries (401, 411). Each of the entries may specify a mapping between an identifier of a component (e.g., 401A, 411A) and associated validated configurations (e.g., 401B, 411B) and, thereby, create associations between types of components and validated configurations.

In one or more embodiments of the invention, the component identifiers (401A, 411A) are identifiers of components of a computing device. A component of a computing device identifier may be, for example, a model of the component of the computing device. The model may be, for example, an identifier of a product line. The component of the computing device model number may be stored in the component of the computing device and may be read by the validation agent via the interface.

In one or more embodiments of the invention, the component identifiers (401A, 411A) of components of a computing device are stored in a host computing device configuration library. In such a scenario, the host computing device configuration library may be used in conjunction with a validation library to: (i) obtain a list of components of the computing device and (ii) obtain validated configurations for each of the components of the computing device. For additional details regarding a host computing device configuration library, See FIG. 4B.

FIG. 4B shows a diagram of an example host device configuration library (450) in accordance with one or more embodiments of the invention. The example host device configuration library (450) may be a data structure that includes information regarding configurations of hosts of validation agents.

In one or more embodiments of the invention, each of the configurations may be associated with a host identifier. For example, a configuration may be associated with all hosts that are of a particular model number.

In one or more embodiments of the invention, each of the configurations may be associated with a type of computing device that is a host. For example, a configuration may be associated with all computing devices that are of a particular model that host validation agents. Thus, the configurations may be associated with any computing device of a particular type that hosts validation agents.

In one or more embodiments of the invention, the example host device configuration library (450) includes entries (451, 452). Each of the entries may specify a mapping between an identifier of a host (e.g., 451A, 452A) and a configuration (e.g., 451B, 452B) and, thereby, specify associations.

In one or more embodiments of the invention, the host identifiers (451A, 452A) are identifiers of computing devices of a particular type. The type may be, for example a model number of the computing device. The model number may be stored in a storage of the computing device and may be read by the validation agent via an interface.

In one or more embodiments of the invention, the configuration (451A, 452B) of each entry specifies one or more component identifiers. The component identifiers may specify types of components that the associated host may include to be in a validated configuration. Thus, hosts that do not include the prescribed components specified in the configurations may be determined to be in a not validated configuration. If the hosts include only the prescribed components, each of the components may then be evaluated using the validation library (e.g., 400) to determine whether all of the components are also validated.

While the data structures illustrated in FIGS. 4A and 4B are shown as lists of entries, the data structures may have different formats without departing from the invention. Additionally, the information included in the aforementioned data structures may be combined or otherwise stored in a different combined format without departing from the invention. Further, the aforementioned data structures may be subdivided into multiple data structures without departing from the invention.

Figure 5:
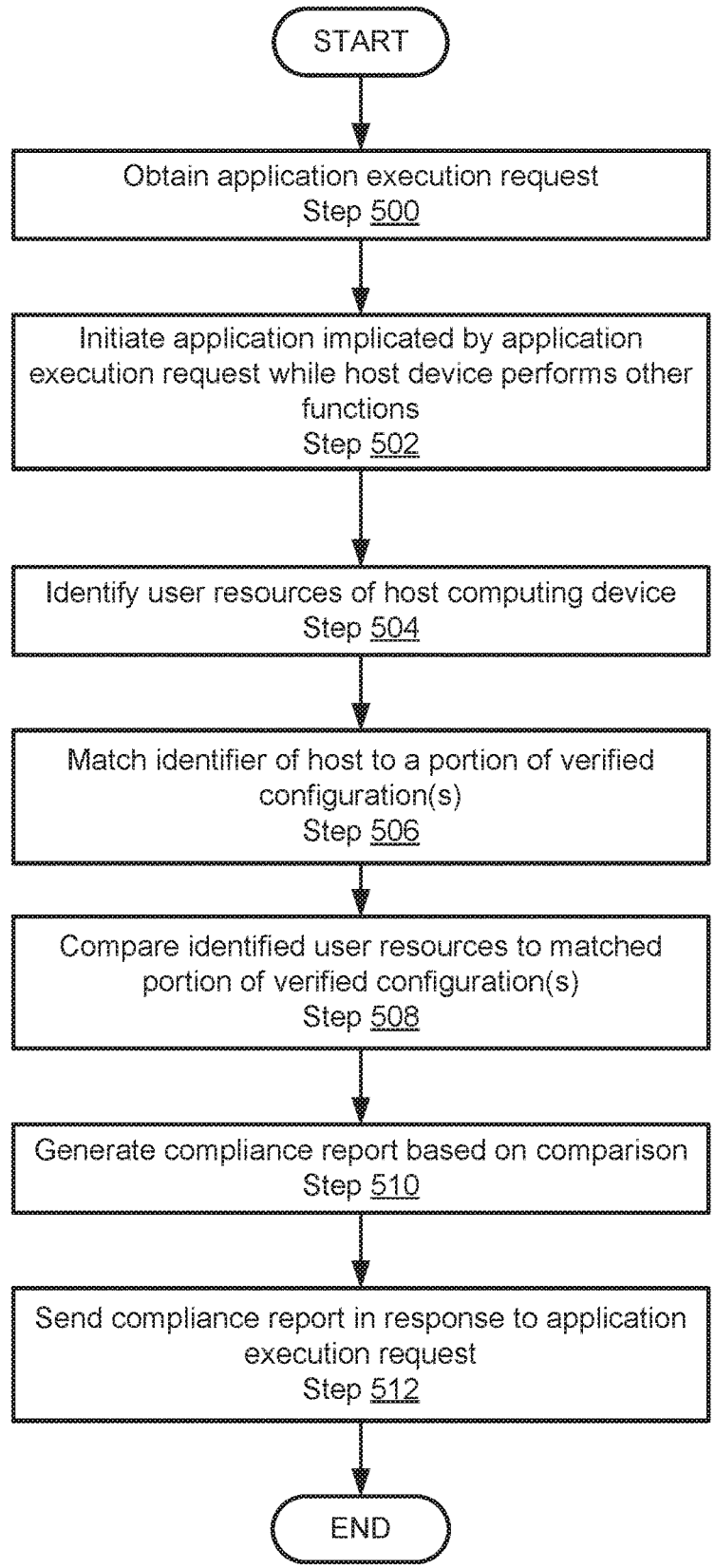
FIG. 5 shows a diagram of a flowchart of a method to verify a configuration of a computing device in accordance with one or more embodiments of the invention.

As discussed above, the example validation agent (300, FIG. 3) may perform methods for determining whether user resources of computing devices are validated and/or authorize or deny new configurations of user resources. FIG. 5 shows a method in accordance with one or more embodiments of the invention that may be performed by the example validation agent (300, FIG. 3).

FIG. 5 shows a flowchart of a method in accordance with one or more embodiments of the invention. The method depicted in FIG. 5 may be used to verify a configuration of a computing device in accordance with one or more embodiments of the invention. The method shown in FIG. 5 may be performed by, for example, a validation agent (e.g., 300, FIG. 3). Other component of the system illustrated in FIG. 1 may perform the method of FIG. 5 without departing from the invention.

In Step 500, an application execution request is obtained by a validation agent.

In one or more embodiments of the invention, the application execution request is obtained from a verifier (e.g., 100, FIG. 1). The application execution request may be included as part of a new configuration authentication request for a computing device. The application execution request may specify executable program code stored on a persistent storage of a validation agent.

In Step 502, an application implicated by the application execution request is initiated while a computing device hosting the validation agent performs other functions.

In one or more embodiments of the invention, the application is initiated by executing, on a processor of the validation agent, the executable program code specified in the application execution request. Initiating the application may cause the application to utilize the processor, memory, persistent storage, and/or network adapter of the validation agent.

In one or more embodiments of the invention, other functions are user applications that utilize user resources. For example, the other functions may be an operating system, an application managed by an operating system, or another executing program that utilizes the processor, memory, persistent storage, and/or network adapter of the computing device hosting the validation agent.

In Step 504, user resources of the computing device hosting the validation agent are identified.

In one or more embodiments of the invention, the user resources are identified by utilizing an interconnect of the computing device hosting the verification. For example, the validation agent may send commands to components of the user resources of the computing device via the interconnect. In response, the component of the user resources may send responses to the validation agent via the interconnect.

In one or more embodiments of the invention, the identified user resources include identifiers of one or more processors (e.g., central processing units/processing cores), memory (e.g., random access memory), persistent storage (e.g., hard disk drives, tape drives, solid state storage, etc.), and/or network adapter (e.g., component that provides a network interface). The identifier user resources may include identifiers of other components of the user resources without departing from the invention. In one or more embodiments of the invention, the identifiers of the persistent storage may include multiple identifiers of different physical storage devices (e.g., a heterogeneous persistent storage). For example, user resources may include multiple solid state drives and multiple hard disk drives. The identifiers of the persistent storage may include identifiers of multiple and/or different types of physical storage devices. The identifiers of the other components of the user resources may also include multiple identifiers of different types of each of the components without departing from the invention.

In one or more embodiments of the invention, each identifier of the user resources specifies a component type and/or a version number. The component type may be specified at any level of granularity. For example, the component type may be a manufacturer (e.g., a manufacturer of a solid state drive). In another example, the component type may be a product of a manufacturer (e.g., model of a solid state drive). In a further example, the component type may be a binned grouping of a product of a manufacturer (e.g., a specific model of a solid state drive with a specific input-output rating). In yet a further example, the component type may be a stock keeping unit (SKU). The version number may be a generation number of a component. For example, as products are manufactured over time minor changes to a product may be made. Rather than rebranding the product with minor changes as a different product the product with minor changes may be specified as a version of an existing product.

In one or more embodiments of the invention, each identifier of the user resources specifies a firmware identifier of a physical component of the user resources. As used herein, firmware refers to software instructions stored on a component that when executed by the component gives rise to a process or other application that orchestrates the operation of the component. For example, a solid state disk drive may include software instructions that orchestrate the selection of a storage location for data within the storage resources of the solid state drive. The firmware identifier may identify the firmware with any level of granularity. For example, the firmware identifier may specify a manufacturer of the firmware. In another example, the firmware identifier may specify a stock keeping unit of the firmware. In a still further example, the firmware identifier may specify a name of a firmware. The firmware identifier may include different information without departing from the invention.

In one or more embodiments of the invention, each identifier of the user resources specifies a driver identifier associated with a physical component of the user resources. As used herein, a driver refers to software instructions stored on a persistent storage that when executed by a processor gives rise to a process or other application that enables an operating system, or other application, to interface with the associated physical component of the user resources. For example, a driver may be associated with a solid state drive that enables an application to instruct the solid state drive to store data or to provide stored data. The driver identifier may identify the driver with any level of granularity. For example, the driver identifier may specify a manufacturer of the driver. In another example, the driver identifier may specify a stock keeping unit of the driver. In a still further example, the driver identifier may specify a name of a driver. The driver identifier may include different information without departing from the invention.

In one or more embodiments of the invention, identified user resources include one or more identifiers of physical components, firmware, firmware settings, and/or drivers. The identified user resources may include any quantity of identifiers without departing from the invention.

In Step 506, an identifier of the computing device hosting the validation agent is matched to a portion of validated configurations of a number of validated configurations.

In one or more embodiments of the invention, the identifier of the computing device is obtained via the interconnect. For example, a request for the computing device identifier of the computing device hosting the validation agent may be sent to computing device hosting the validation agent via the interconnect. In response, the computing device hosting the validation agent may send its computing device identifier.

In one or more embodiments of the invention, the computing device identifier is a product type. For example, the computing device identifier may not uniquely identify the computing device but may indicate that the computing device is one of a particular product line.

In one or more embodiments of the invention, the portion of validated configurations is identified by matching the computing device identifier of the host to entries of a host device configuration library (e.g., 450, FIG. 4B). Each entry of the host device configuration library may specify an associated configuration. As described with respect to FIG. 4B, the configuration may include any number of component identifiers (e.g., identifiers of physical components, firmware, firmware settings, or drivers). The component identifiers may then be used in conjunction with a validation library (e.g., 400, FIG. 4A) to obtain validated configurations on a per component basis.

In Step 508, the identified user resources are compared to the matched portion of the verified configurations.

In one or more embodiments of the invention, performing the comparison identifies whether all of the identified user resources match any of the verified configurations. For example, the verified configurations for example user resources may include three configurations for a solid state drive. If the identified user resources include a solid state drive that has a fourth configuration (e.g., a firmware version that is not specified by any of the three configurations), performing the comparison would identify the user resources are not in a validated configuration.

In Step 510, a compliance report is generated based on the comparison.

In one or more embodiments of the invention, the compliance report includes either an authorization of a new configuration of the user resources or a rejection of the new configuration of the user resources. For example, if the comparison indicates that the user resources, before the new configuration is applied, are not in a validated configuration, the compliance report may reject the new configuration for the user resources. In contrast, if the comparison indicates that the user resources are in a validated configuration, the compliance report may authorize the new configuration.

In one or more embodiments of the invention, rather than rejecting a new configuration for user resources when the user resources are not in a validated configuration the validation agent may reconfigure the user resources into a validated configuration. For example, the validation agent may replace firmware, change firmware settings, and/or replace drivers so that the user resources are in a validated state. Once in a validated state, the generated compliance report may be updated to reflect the changes. In one or more embodiments of the invention, in the aforementioned scenario where a validation agent reconfigured user resources the compliance report is further updated to specifically identify the changes made during the reconfiguration of the user resources.

In one or more embodiments of the invention, the validation agent may reconfigure the user resources based on firmware, firmware settings, and/or drivers stored in a persistent storage of the validation agent. In one or more embodiments of the invention, the validation agent may reconfigure the user resources based on firmware, firmware settings, and/or drivers stored in a persistent storage of another computing device. The another computing device may be, for example, a server or a cloud resource operably connected to the validation agent.

The generated compliance report may be, for example, a data structure stored in memory or persistent storage of the validation agent.

In one or more embodiments of the invention, the compliance report may include a listing of the physical components, firmware, firmware settings, and/or drivers of the user resources that are not in a validated configuration. The listing may specify each difference from the validated configuration.

In Step 512, the compliance report is sent in response to the application execution request.

In one or more embodiments of the invention, the compliance report is sent to a requesting entity that sent the application execution request. In one or more embodiments of the invention, the requesting entity is a verifier. In one or more embodiments of the invention, the requesting entity is the computing device hosting the validation agent. The compliance report may be sent to another entity, other than the requesting entity, without departing from the invention. For example, the application execution request may specify the another entity. In another example, the executable program code may specify the anther entity.

In one or more embodiments of the invention, sending the compliance report authorizes or rejects the new configuration for the user resources. For example, a compliance report that authorizes the new configuration may include a code, or other data, that is required for the user resources to be reconfigured. If the code or other data is not included the user resources may not be reconfigured and, thus, not include the code or other data may reject the new configuration. For example, the user resources may include a management entity, or other agent, that orchestrates the reconfiguration of the user resources. If the code or data is not included, the management entity may prevent added physical component, firmware, and/or drivers from operating. The management entity may also prevent changes to firmware settings or other software components from taking effect.

In one or more embodiments of the invention, the compliance report is sent to a requesting entity by the validation agent via a network adapter of the validation agent.

In one or more embodiments of the invention, the compliance report is sent to a requesting entity by the validation agent via a network adapter of the user resources. The validation agent may interface with the network adapter of the user resources via an interconnect. In one or more embodiments of the invention, the validation agent has a different internet protocol address, media access control address, and/or other network identifier than the computing device hosting the validation agent. In other words, any of the aforementioned addresses/identifiers may be advertised separately from the addressed/identifiers of the computing device hosting the validation agent.

The method may end following Step 512.

Figure 6:
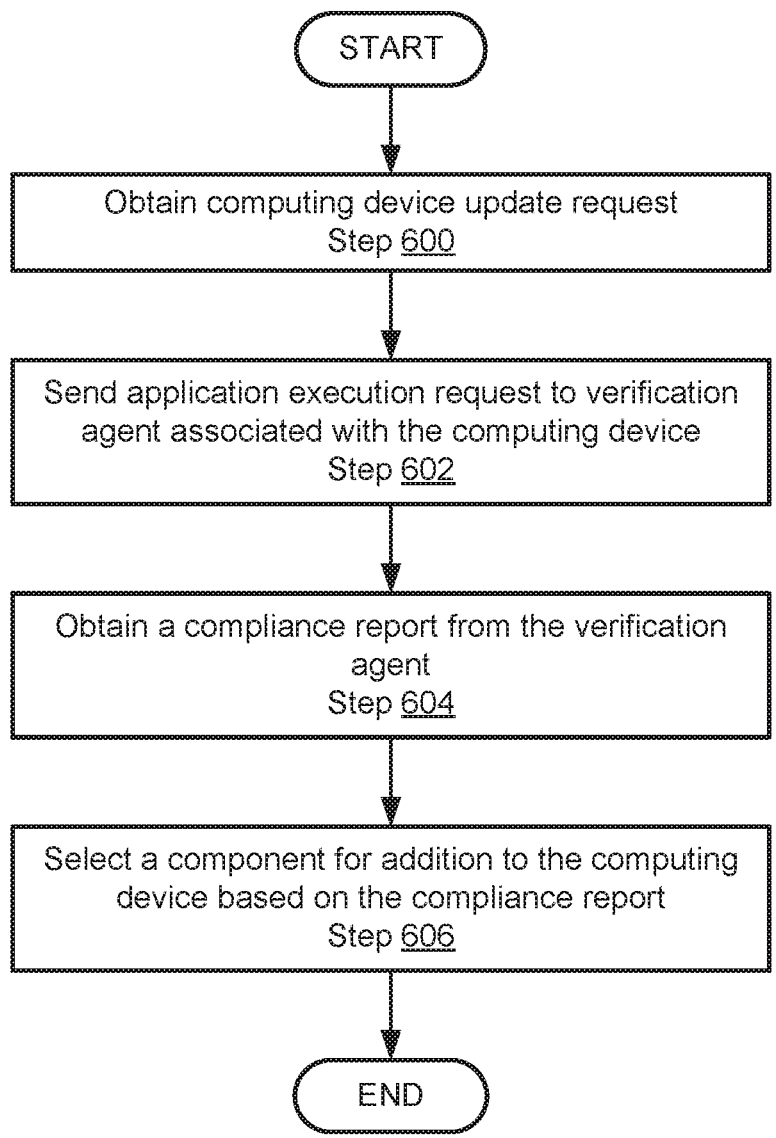
FIG. 6 shows a diagram of a flowchart of a method to select components for reconfigurations of user resources of computing devices in accordance with one or more embodiments of the invention.

As discussed above, the verifier (100, FIG. 1) may perform methods for reconfiguring user resources of computing devices hosting validation agents. FIG. 6 shows a method in accordance with one or more embodiments of the invention that may be performed by the verifier (100, FIG. 1).

FIG. 6 shows a flowchart of a method in accordance with one or more embodiments of the invention. The method depicted in FIG. 6 may be used to select components for reconfigurations of user resources of computing devices in accordance with one or more embodiments of the invention. The method shown in FIG. 6 may be performed by, for example, a verifier (100, FIG. 1). Other component of the system illustrated in FIG. 1 may perform the method of FIG. 6 without departing from the invention.

In Step 600, a computing device upgrade request is obtained.

In one or more embodiments of the invention, the upgrade request specifies a change to a computing resource of the computing device. The change may be, for example, a change in processing power, memory capacity, storage capacity, data transfer rate via a network, or other change to another computing resource.

In one or more embodiments of the invention, the upgrade request specifies a computing device. The computing device may be specified by including an identifier of the computing device. The identifier may be any type of identify that specifies the computing device at any level of granularity that enables the computing device to be identified so that an upgrade or change to the computing device can be performed without departing from the invention.

In Step 602, an application execution request is sent to a validation agent associated with the computing device.

In one or more embodiments of the invention, the validation agent is associated with the computing device by being hosted by the computing device.

In one or more embodiments of the invention, the application execution request may be sent to the validation agent via a network, as opposed to being sent to the computing device and then being provided to the hosted validation agent.

In one or more embodiments of the invention, the validation agent may expose an interface that enables the verifier to send the request to the validation agent. For example, the validation agent may implement a representational state transfer web service that exposes textual representations of web resources using a uniform and predetermined set of stateless operations. As used herein, a web resource refers to a resource that can be identified, named, addressed, and/or handled via the Internet or other web network. For example, the validation agent may expose uniform resource identifiers that are advertised on/addressable via the Internet. Requests made to the exposed uniform resource indicators may cause a corresponding executable program code stored on a persistent storage of the validation agent to be executed.

In Step 604, a compliance report is obtained from the validation agent.

In one or more embodiments of the invention, the compliance report is obtained via a message from the validation agent. The message may be sent from the validation agent in response to the application execution request. In one or more embodiments of the invention, the compliance report is included in the message from the validation agent.

In Step 606, a component for addition to the computing device is selected based on the obtained compliance report.

As discussed with respect to FIG. 5, the compliance report may include an authorization or rejection. If the compliance report includes an authorization, a component may be selected. If the compliance report includes a rejection, no component may be selected.

The method may end following Step 606.

Figure 7:
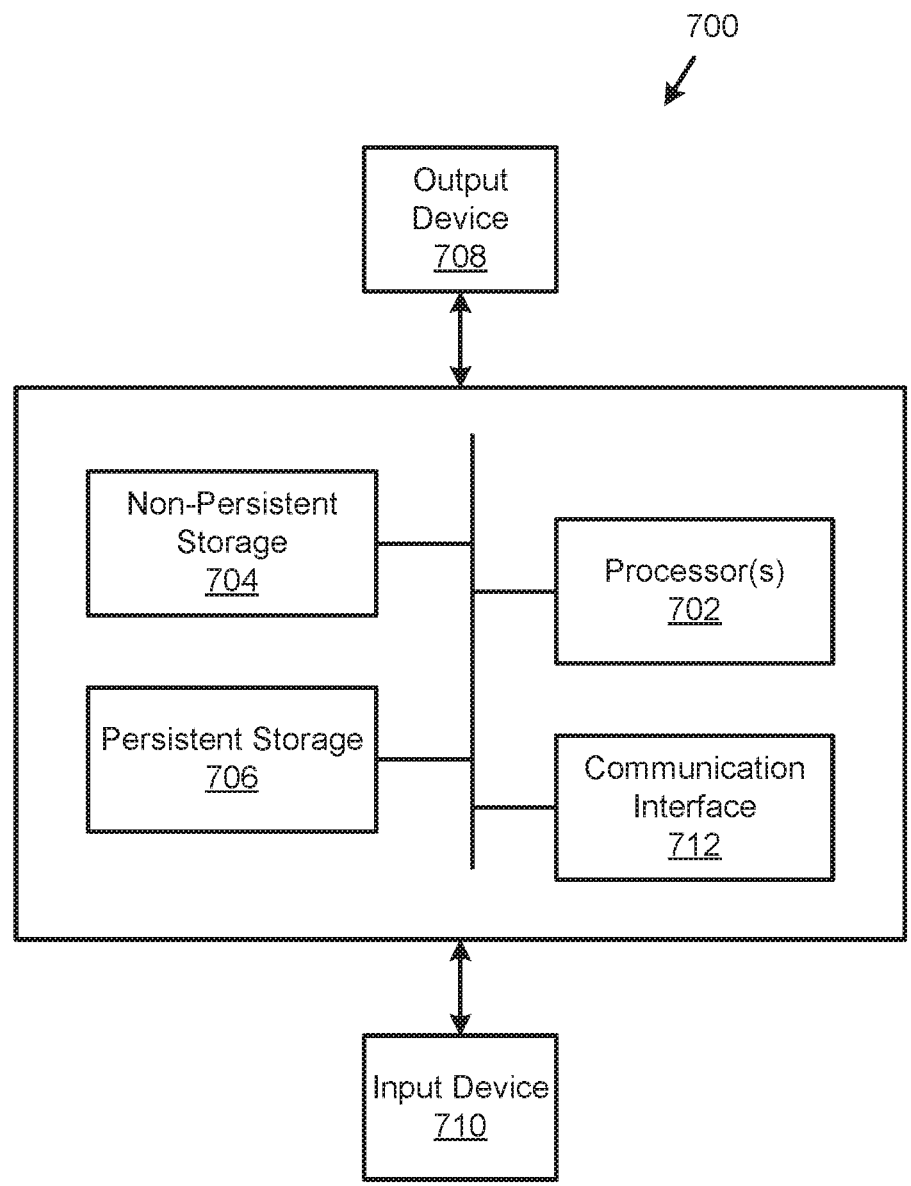
FIG. 7 shows a diagram of a computing device not hosting a validation agent in accordance with one or more embodiments of the invention.

As discussed above, embodiments of the invention may be implemented using generic computing devices in addition to specific computing devices as shown in FIGS. 2-3. FIG. 7 shows a diagram of a computing device that does not host a validation agent in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may improve the performance of computations, data storage, and/or communications in a network environment by improving the reliability of reconfigurations of computing devices. More specifically, embodiments of the invention may improve the performance of computations, data storage, and/or communications by ensuring that configurations of computing devices have been validated as operating correctly before a reconfiguration of a computing device is allowed. For example, in a network environment, the speed of computation, rate of data storage, and bandwidth of communications is impacted by all components of the network. A single computing device may disrupt the performance of computations, data storage, and/or communications if it is not operating as expected.

Embodiments of the invention may prevent a computing device from being reconfigured in a manner that results in the computing device operate in a way that is unexpected. By doing so, embodiments of the invention may ensure that a distributed system including computing devices that are operably connected by a network operates as expected by ensure that each computing device has a configuration that is already validated. Accordingly, at least one or more embodiments of the invention address the problem of misconfigured computing devices in a distributed system that reduces the performance of the distributed system. The aforementioned problem arises due to the nature of the technological environment in which distributed systems operate.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device in a distributed network, comprising:
    resources of the computing device comprising hardware components and software components for controlling the hardware components; and
    a validation agent programmed to:
        obtain a new configuration authentication request for the computing device;
        in response to obtaining the new configuration authentication request:
            identify the resources of the computing device,
            match an identifier of the computing device to a portion of validated configurations of a plurality of validated configurations associated with the distributed network stored in a persistent storage of the validation agent, wherein the validated configurations each specify a combination of the hardware components and the software components, the software components comprising firmware, firmware settings, and software drivers,
            make a determination that the identified resources of the computing device match at least one validated configuration of the portion of validated configurations of the plurality of validated configurations associated with the distributed network; and
        authorize a new configuration for the resources of the computing device in response to the determination.

2. The computing device of claim 1, wherein the validation agent is further programmed to:
    after a change to the resources of the computing device:
        obtain a second new configuration authentication request for the computing device;
        in response to obtaining the second new configuration authentication request:
            identify the changed resources of the computing device,
            make a second determination that the identified changed user resources does not match any validated configuration of the portion of the plurality of validated configurations associated with the distributed network; and
        reject a second new configuration for the resources of the computing device in response to the second determination.

3. The computing device of claim 1, wherein the resources of the computing device comprise:
    a processor;
    a memory;
    a persistent storage; and
    an interconnect that operably connects the processor, the memory, and the persistent storage.

4. The computing device of claim 3, wherein the validation agent comprises:
    a second processor;
    a second memory; and
    a second persistent storage,
    wherein the validation agent is operably connected to the interconnect.

5. The computing device of claim 4, wherein the resources of the computing device are unable to interact with the validation agent via the interconnect.

6. The computing device of claim 1, wherein identifying the resources of the computing device comprises:
    accessing an interconnect of the resources of the computing device while the resources perform functions for a user; and obtaining, via the accessing, identifiers of a plurality of resources of the resources of the computing device.

7. The computing device of claim 6, wherein the identifiers comprises:
a processor identifier;
a persistent storage identifier;
an interconnect identifier; and
a memory identifier.

8. The computing device of claim 6, wherein identifying the resources of the computing device further comprises:
obtaining, via the accessing, a version identifier for a resource of the plurality of resources of the resources of the computing device.

9. The computing device of claim 8, wherein persistent storage identifier comprises:
a solid state drive identifier; and
a hard disk drive identifier.

10. The computing device of claim 1, wherein the resources of the computing device are identified without interrupting user functions of the resources of the computing device.

11. The computing device of claim 1, wherein the computing device advertises:
an internet protocol address associated with the computing device; and
a second internet protocol address associated with the validation agent.

12. The computing device of claim 11, wherein the validation agent comprises:
a network adapter separates from a second network adapter of the resources of the computing device,
wherein the validation agent obtains the new configuration authentication request via the network adapter.

13. The computing device of claim 11, wherein the resources of the computing device comprise:
a network adapter,
wherein the validation agent obtains the new configuration authentication request via the network adapter.

14. The computing device of claim 1, each validated configuration of the plurality of validated configurations associated with the distributed network specifies:
a plurality of hardware components, and
a range of version numbers for each hardware component of the plurality of hardware components.

15. A method for authorizing a new configuration of resources of a computing device in a distributed network, comprising:
obtaining, by a validation agent hosted by the computing device, a new configuration authentication request for the computing device;
in response to the obtained new configuration authentication request:
identifying, by the validation agent, the resources of the computing device comprising hardware components and software for controlling hardware components,
matching, by the validation agent, an identifier of the computing device to a portion of validated configurations of a plurality of validated configurations associated with the distributed network stored in a persistent storage of the validation agent, wherein the validated configurations each comprise a combination of hardware components and software components, the software components comprising firmware, firmware settings, and software drivers,
making a determination, by the validation agent, that the identified resources of the computing device match at least one validated configuration of the portion of validated configurations of the plurality of validated configurations associated with the distributed network based on the matching; and
authorizing, by the validation agent, the new configuration for the resources of the computing device in response to the determination.

16. The method of claim 15, further comprising:
after a change to the resources of the computing device:
obtaining, by the validation agent, a second new configuration authentication request for the computing device;
in response to the obtained second new configuration authentication request:
identifying, by the validation agent, the changed resources of the computing device,
making a second determination, by the validation agent, that the identified changed resources of the computing device does not match any validated configuration of the portion of validated configurations of the plurality of validated configurations associated with the distributed network based on the matching; and
rejecting, by the validation agent, a second new configuration for the resources of the computing device in response to the second determination.

17. The method of claim 15, wherein the resources of the computing device are identified without interrupting user functions of the resources of the computing device.

18. A non-transitory computer readable medium comprising computer readable program code, which when executed by a computer processor enables the computer processor to perform a method for authorizing a new configuration of resources of a computing device in a distributed network, the method comprising:
obtaining, by a validation agent hosted by the computing device, a new configuration authentication request for the computing device;
in response to the obtained new configuration authentication request:
identifying, by the validation agent, the resources of the computing device comprising hardware components and software for controlling hardware components,
matching, by the validation agent, an identifier of the computing device to a portion of validated configurations of a plurality of validated configurations associated with the distributed network stored in a persistent storage of the validation agent, wherein the validated configurations each comprise a combination of hardware components and software components, the software components comprising firmware, firmware settings, and software drivers,
making a determination, by the validation agent, that the identified resources of the computing device match at least one validated configuration of the portion of validated configurations of the plurality of validated configurations associated with the distributed network based on the matching; and
authorizing, by the validation agent, the new configuration for the resources of the computing device in response to the determination.

19. The non-transitory computer readable medium of claim 18, wherein the method further comprising:

after a change to the resources of the computing device:
  obtaining, by the validation agent, a second new configuration authentication request for the computing device;
  in response to obtaining the second new configuration authentication request:
  identifying, by the validation agent, the changed resources of the computing device,
  making, by the validation agent, a second determination that the identified changed resources of the computing device does not match any validated configuration of the portion of the plurality of validated configurations associated with the distributed network; and
  rejecting, by the validation agent, a second new configuration for the resources of the computing device in response to the second determination.

20. The non-transitory computer readable medium of claim 18, wherein the resources of the computing device are identified without interrupting user functions of the resources of the computing device.

* * * * *